United States Patent Office 2,780,234
Patented Feb. 5, 1957

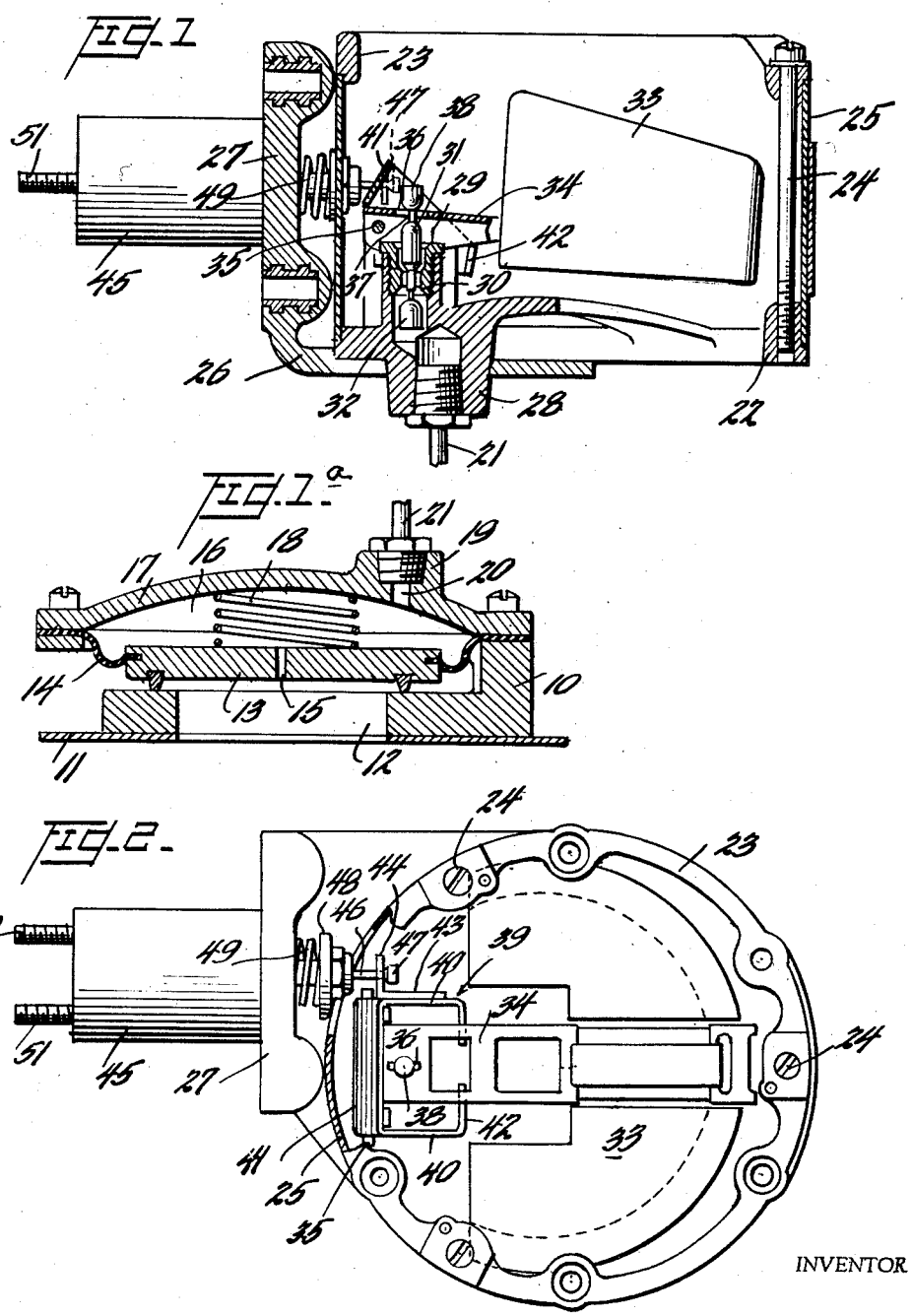

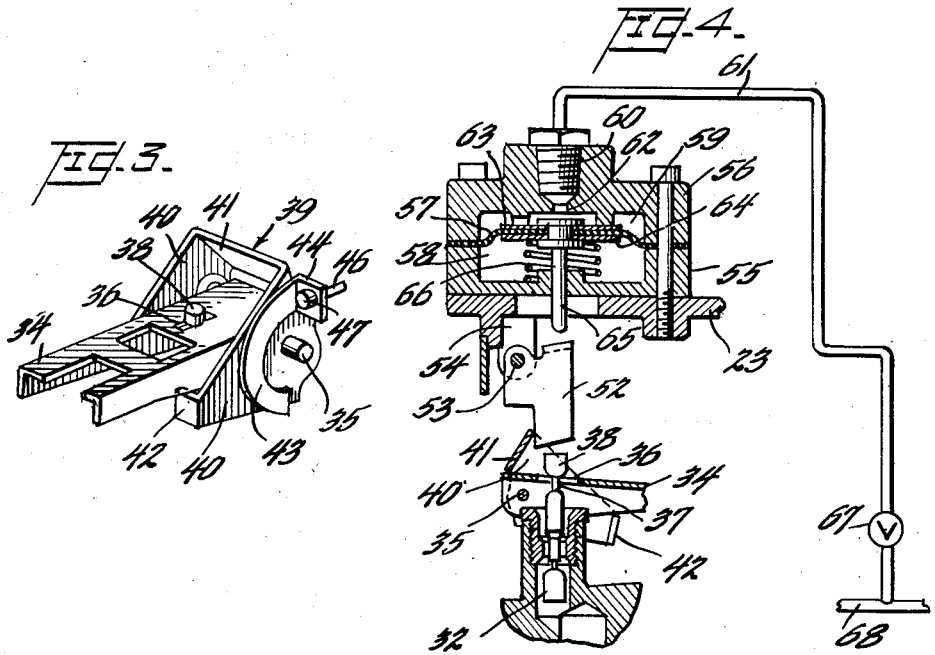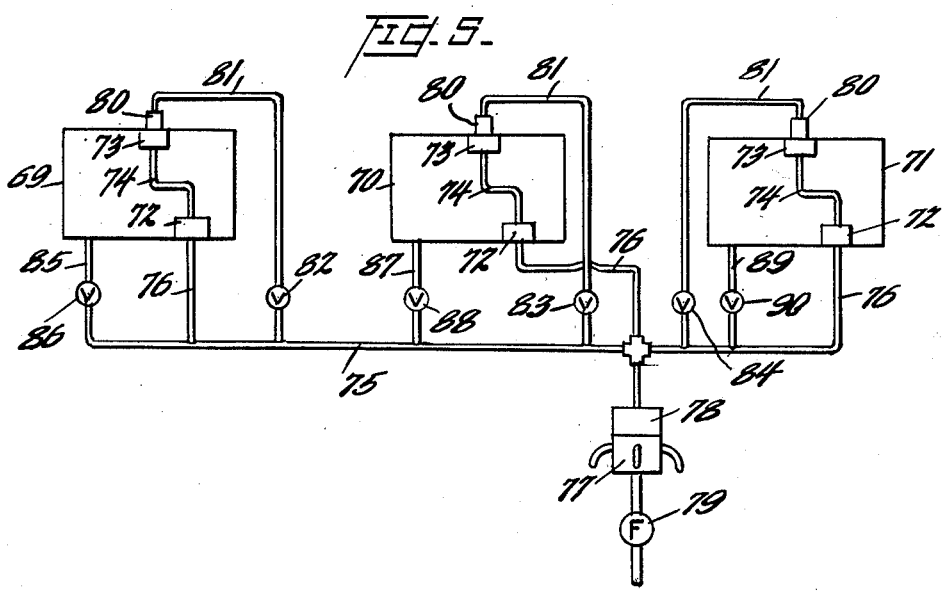

2,780,234

MANUALLY OPERATED MECHANISM FOR CLOSING FLOAT CONTROLLED PILOT VALVE

John G. Russell, Mayfield Heights, Ohio

Application May 21, 1953, Serial No. 356,367

6 Claims. (Cl. 137—390)

The invention relates to new and useful improvements in a fluid pressure operated valve for filling tanks with which is associated a float controlled pilot valve operating to cause the fluid pressure to close the main valve when the fluid in the tank reaches a predetermined level.

There are times when it is desirable to manually close the pilot valve to test whether it will function properly to close the main valve automatically when the tank has been filled to a predetermined level. There are also times when filling a series of tanks that it is desirable to selectively close one or more of the pilot valves to prevent the opening of the main valve of the tank with which it is associated.

An object of the invention is to provide a float controlled pilot valve of the above type with a manually controlled power operated mechanism for raising the pilot valve lever for closing the pilot valve, which mechanism is normally in an inoperative position so as to permit the normal opening and closing of the pilot valve by the float operated lever.

A further object of the invention is to provide a float controlled pilot valve of the above type with a member adapted to engage the float lever for raising the same to close the pilot valve, which member is normally in an inoperative position so that the valve lever is free for actuation by said float and with a manually controlled power means operating at will through said member to raise the float lever and close the pilot valve.

A still further object of the invention is to provide a series of tanks connected to a common manifold for filling and draining said tanks wherein each tank is equipped with a float controlled fluid pressure operated intake valve and wherein each tank is provided with a manually controlled power operated mechanism for closing the pilot valve and the main intake valve associated therewith, which mechanism is normally inoperative so that the pilot valve is free to be actuated by the float controlled lever.

These and other objects will in part be obvious and will in part be hereinafter more fully disclosed.

In the drawings:

Figure 1 is a vertical sectional view through a pilot operated valve with which is associated a power operated mechanism for closing the pilot valve at will.

Figure 1ᵃ is a vertical sectional view through a well known form of fluid pressure operated valve mechanism with which the pilot valve mechanism of Figure 1 is to be associated.

Figure 2 is a top plan view of the pilot valve mechanism shown in Figure 1.

Figure 3 is a perspective view of the member associated with the float controlled lever and a portion of said lever which is lifted thereby.

Figure 4 is a view showing in vertical section a slightly modified form of manually controlled operated mechanism for lifting the float lever to close the pilot valve.

Figure 5 is a schematic view of a single point fueling system including three tanks, each of which is provided with a pilot valve and a manually controlled power mechanism associated with said pilot valve for raising the float lever for closing the pilot valve and thus insuring the closing of the main intake valve or the holding of said intake valve closed.

The present invention is employed with a float controlled pilot valve associated with the fluid pressure operated intake valve for a tank. The fluid pressure operated intake valve may be of any well known construction. As illustrated in Figure 1ᵃ the valve is of a single diaphragm type. It includes a housing 10 attached to the bottom wall 11 of the tank in any suitable way. The bottom wall of the housing 10 has an intake port 12 connected in the usual way to a pipe leading to a supply system furnishing fluid under pressure. There is a main valve 13 carried by a diaphragm 14 which extends across the housing 10. The main valve has a restricted opening 15 therethrough which leads to a chamber 16 formed in the housing 10 between the cap plate 17 therefor and the diaphragm supported valve 13. A spring 18 normally tends to move the valve toward the valve seat surrounding the port 12. There is a boss 19 extending outwardly from the cap plate 17 and this boss has a passage 20 connected to the chamber 16. The boss is adapted to receive an adapter to which is connected a pipe 21 which leads to the pilot valve.

Above the main valve housing 10 is a pilot valve housing including a bottom ring member 22 and a top ring member 23 which is connected to the bottom ring member by bolts 24. Surrounding the bolts 24 is a relatively thin protecting housing 25. The bottom ring member 22 is mounted on a bracket arm 26 carried by a base member 27 which is bolted or otherwise secured to the side member of the tank.

The bottom member 22 is provided with a depending boss 28 extending through an opening in the bracket arm 26; said boss is provided with an adapter to which the pipe 21 is connected. The boss extends upwardly from the supporting base ring and has threaded into the upper end thereof an adapter 29 which is provided with a valve seat 30 at the lower end thereof. Extending through the adapter 29 is a valve carrying stem 31. Mounted on the lower end of the stem is the pilot valve 32. When the valve stem 31 is raised the valve 32 will engage the valve seat 30 and close the passage leading from the pipe 21 to the tank and when the valve stem is lowered to the position shown in Figure 1, then the passage will be opened so that fluid will flow upwardly through the pipe 21 into the tank during a filling operation when the main valve is open. Associated with the pilot valve is a float 33 mounted on a float lever 34 which is in turn pivotally mounted on a pin 35. There is an opening 36 through this float lever 34 and the valve stem is provided with a neck portion 37 which extends through the float lever. The upper end of the valve stem is provided with a head 38 which is larger than the opening and the valve stem beneath the neck portion is also larger than the opening. When the float lever swings upwardly or counterclockwise on the pivot pin 35 it will lift the valve stem and move the valve 32 into tight sealing engagement with the valve seat 30. When the float lever moves downward or in a clockwise direction the valve will be positively moved to open position. This opening and closing of the valve is controlled by the float. The force of gravity operating upon the float is, of course, slightly less than the buoyancy of the liquid in the tank.

If the tank is empty the float will be in its lower position and the pilot valve 32 will be open. When the fluid under pressure is turned on the main valve it will open the main valve and hold it open as long as the pilot valve is open for the reason that the fluid passing through the restricted opening 15 in the valve will also pass through the tube 21 and out through the pilot valve to the tank. When, however, the float is raised by the fluid until a predetermined level is attained in the tank this will close the pilot valve 32 and when the pilot valve closes a pressure will develop on the chamber 16 which will close the valve 13. It is noted that the area contacted by the fluid on the upper side of the valve is considerably greater than the area contacted by the fluid on the underside of the valve and also that the spring 18 tends to move the valve toward closed position. This is the normal operation of a float controlled pilot valve which in turn controls the opening and closing of the main valve.

There are times when it is desirable to move the float lever to its full raised position so that the pilot valve will be closed. Mechanism has been provided for raising the float lever which mechanism includes a rocker 39 formed preferably of sheet metal bent so as to provide side members 40, 40 connected by a top member 41. These side members 40, 40 are mounted on the pivot pin 35 for free oscillation thereof. The side members 40, 40 each has an inwardly bent portion 42 which is adapted to extend beneath the float lever 34. The float lever is preferably formed of sheet metal and has depending side members which are mounted on the pivot pin 35 and it is these depending side members beneath which the bent portions 42, 42 extend.

Brazed to one of the members 40 is a plate 43. Said plate has its upper end portion bent outwardly away from the rocker as shown at 44.

Associated with this mechanism for lifting the float lever is a manually controlled power mechanism which, as illustrated in Figures 1 and 2, includes a solenoid 45. Attached to the solenoid core member is a pull rod 46, which pull rod extends through the rocker member 44 and is provided with a head 47 which is larger than the opening in the member 44, so that a pull on the rod 46 will oscillate the rocker 39 in a clockwise direction as shown in Figure 3 and this will raise the float lever 34 overriding the gravitational energy operating on said float lever. When the solenoid 45 is energized it will exert a pull on this rod 46 which will lift the float lever until the valve 32 is closed. Mounted on this pull rod 46 is a washer 48. A spring 49 surrounds the core extension and pull rod and bears at the outer end against the washer and at its inner end against the solenoid housing. When the solenoid is deenergized this spring will move the plunger so as to completely free the rocker 39 so that the rocker by gravity will move to a position where it no longer has a lifting engagement with the float lever. When the rocker is so positioned then the float lever is free to move up or down under the control of the float. The solenoid has two leads indicated at 50 and 51 in Figure 2 of the drawings. One of these leads is connected to a ground circuit and the other is connected through a manually operated switch to a source of electrical energy.

No matter what may be the position of the float lever when the solenoid is energized it will exert a pull on the rod 46 which will oscillate the rocker 39 and cause it to lift the float lever to its fully raised position. This will close the valve 32. When the valve 32 is closed it will cause pressure to develop on the chamber 16, which brings about a closure of the main valve. When the solenoid is deenergized then the pull rod will be released from any pulling action on the rocker 39 and it will move by gravity to a point where it is free from engagement with the float lever so that the float lever will move up and down under the control of the float in the normal way. Some of the purposes of this manually controlled power means for lifting the float lever and closing the pilot valve will be described hereinafter.

In Figure 4 there is shown a slightly modified form of power operated mechanism for oscillating the rocker for lifting the float lever for closing the pilot valve. The pilot valve, float lever and float are all of construction which has been described above. Likewise the rocker 39 is the same as to structure and mounting as has been described above and the reference numerals used in such description have been applied thereto. In the modified form there is an auxiliary rocker 52 mounted on a pivot pin 53 carried by lugs 54 depending from the upper frame member 23 of the pilot housing. Mounted on the pilot valve housing is an hydraulic means for oscillating the auxiliary rocker 52. This hydraulic means includes a base member 55 which is secured to the top frame member of the pilot housing. Bolted to this base member 55 is a cap plate 56. The cap plate and the base member are so constructed as to provide a chamber which is divided by a diaphragm 57 into a lower chamber 58 and an upper chamber 59. This upper plate member 56 has an opening 60 into which is threaded an adapter to which a pipe 61 is connected for furnishing fluid under pressure to the chamber 59.

Leading from the opening 60 into the chamber 59 is a passage 62. Mounted on the diaphragm are plates 63 and 64 between which the diaphragm is clamped. Mounted on the plates is a plunger 65 which extends through the base member 55. A spring 66 normally lifts the plunger to the position shown in Figure 4. The fluid pipe 61 is connected through a valve 67 to the fluid supply line 68 which furnishes fluid under pressure to the tank. When the valve 67 is open fluid under pressure will enter the chamber 59 and force the plunger downwardly causing the lower end thereof to engage the auxiliary rocker 52 and turn the same on the pivot 53 in a clockwise direction. The auxiliary rocker engages the cross member of the main rocker 39 and this will oscillate the main rocker in a counter-clockwise direction on the pivot pin 35 which causes the main rocker to lift the float lever and close the valve. When the valve 67 is closed, cutting off the fluid pressure then the spring 66 will lift the plunger 65 free of the auxiliary rocker and this will permit the main rocker 39 to move out of lifting engagement with the float lever and leave the float lever free to move up and down for opening or closing the pilot valve under the control of the float. This valve 67 which is under control of the operator may be opened at any time and permit fluid to operate the mechanism for lifting the float lever for closing the pilot valve.

In both of the constructions shown in Figures 1 to 3 and in Figure 4 there is a manually controlled power mechanism associated with the pilot valve which mechanism normally has no effect whatever on the operations of the float controlled pilot valve. The float lever is free to swing upwardly under control of the float and will eventually bring about a closing of the pilot valve. When the liquid level drops and the float moves downward the float lever will cause the pilot valve to open. This is the normal operation of the float controlled pilot valve. When the operator desires to close the pilot valve he can do so by rendering the power operating mechanism operative by either closing the switch of the solenoid or by opening the valve 67 of the hydraulically operated plunger.

This mechanism which has been described in detail is referred to as an override mechanism for the reason that when the power is made available to raise the float lever it overrides the gravity operating on the float lever and raises the lever to full position for closing the pilot valve. This override mechanism is very useful for testing the functioning of the main valve prior to the filling of the tank and also for testing the pilot valve in that it checks to see whether the pilot valve is stuck in open position and whether the pilot valve closes off properly when the float lever is raised. To accomplish this pretesting prior to the filling of the tank the solenoid is energized. If the solenoid is used as a power mechanism, and then the fluid supply nozzle is turned for admitting fluid to the underside of the main valve or the energizing of the solenoid causes the pull rod to pull on the main rocker so as to engage and raise the float lever for closing the pilot valve. With the pilot valve closed fluid cannot exhaust itself from the upper side of the fluid pressure operated main valve and thus the pressure builds up on the latter and prevents the same from opening. If, for any reason the diaphragm for the main valve has become ruptured or the main valve has become stuck in open position from a previous operation or if the pilot valve fails to close off fluid will enter the tank when the filling nozzle is turned on and the operator will know that either the main valve or the pilot valve is not functioning properly. When an hydraulic power mechanism is employed the same procedure will be followed. The valve 67 will be opened which will permit fluid under pressure to flow to the chamber 59 and this will operate through the plunger and the auxiliary rocker to close the pilot valve. If the main valve is closed the closing of the pilot valve will hold it closed and therefore continued flow into the tank will indicate to the operator that there is something wrong in the system.

In Figure 5 of the drawings there is illustrated a typical single point fueling system utilizing the manually controlled power means for closing the pilot valve and thus causing the intake valve to close. In this illustration there are three tanks 69, 70 and 71 and each tank is provided at its lower side with a fluid pressure operated main valve 72 and a float operated pilot valve 73 connected to the fluid pressure operated valve 72 by a pilot tubing line 74. The intake of each fluid pressure valve is connected to a common intake line or manifold 75 by separate pipe lines 76. Fluid under pressure from a suitable source is directed to the manifold 75 through a nozzle 77. Said nozzle is connected to a valve 78 which in turn is connected through a pipe line with the manifold. In the supply line leading to the nozzle is a flow meter 79. Associated with the pilot valve is a manually controlled power mechanism which may be of the solenoid type described above or of the hydraulic type likewise described above. In Figure 5 of the drawings the hydraulic unit is indicated at 80. A pipe line 81 connects this hydraulic unit with the manifold so that fluid pressure may be directed from the manifold to the hydraulic unit. In this line 81 associated with the tank 69 is a valve 82 and in the line associated with the tank 70 is a valve 83. Also in the line associated with the tank 71 is a valve 84.

To assist in draining the tank through the manifold or the transfer of fluid from one tank to another there is a pipe 85 leading from the bottom of the tank 69 to the manifold in which is a manually controlled valve 86. There is a similar pipe connection 87 between the tank 70 and the manifold in which there is a manually operated control valve 88. There is also a similar pipe line 89 connecting the tank 71 to the manifold and in this line is a manually operated control valve 90. The override mechanism, whether it be of the solenoid type or the hydraulic type can also be used to prevent the filling of selected tanks when two or more tanks are connected to a common filling manifold. Referring to Figure 5 and assuming that it is desirable to fill tanks 70 and 71 without filling the tank 69, this is accomplished by opening the valve 82 so that the fluid pressure on the manifold will pass through the line 81 to the hydraulic power mechanism 80 and this will lift the float lever so as to close the pilot valve and the closing of the pilot valve will at once close the main intake valve 72. If neither of the tanks 70 or 71 are filled so as to close the pilot valve then the pilot valve will be opened and the intake may be opened by the fluid pressure and the tanks 70 and 71 filled. The manually controlled power mechanism whether of the solenoid type of the fluid pressure type may be used to control interflow from one tank to another when two or more tanks are interconnected through a common manifold.

Referring to Figure 5 again, let us assume that it is desirable to transfer the fluid in tank 69 to the tank 70. This is accomplished by cutting off the flow of fluid from the supply and the closing of the valves 82 and 84. The valve 86 is then opened and fluid in the tank 69 will flow into the manifold and from the manifold through the line 76 to the tank 70. Inasmuch as the valve 84 is open, fluid under pressure will pass through the line 81 to the hydraulically controlled pilot valve and close the same, thus closing the intake valve. The opening of the valve 82 will permit fluid draining from the tank 69 to close the pilot valve and thus close the intake valve so that all fluid drawn from the tank 69 through the pipe 85 will pass to the tank 70. For the purpose of transfer the tank 69 may be put under gas pressure. The tank 70 which is being filled is under the control of the pilot valve so that when the tank is filled to a predetermined level the valve will be closed and this will automatically close the intake valve and prevent further transfer of fluid to said tank.

It will be apparent that other advantages and uses may be made of the manually controlled power means for closing the pilot valve at will. It is also obvious that minor changes in the details of construction may be made without departing from the spirit of the invention as set forth in the appended claims.

I claim:

1. An actuating mechanism for a float controlled pilot valve having a pivoted valve controlling lever movable by a float into valve opening and closing positions comprising a rocker mounted on the pivot for the float lever and having arms extending beneath said float lever, said rocker when free being movedf by gravity to an inoperative position free from the float lever so that the float lever may be actuated by the float, and manually controlled power means for moving the rocker into engagement with the float lever for moving the latter into valve closing position.

2. An actuating mechanism for a float controlled pilot valve having a pivoted valve controlling lever movable by a float into valve opening and closing positions comprising a rocker mounted on the pivot for the float lever and having arms extending beneath said float lever, said rocker when free being moved by gravity to an inoperaerative position free from the float lever so that the float lever may be actuated by the float, a solenoid having means when energized adapted to move into engagement with said rocker for causing said rocker to raise the float lever into valve closing position, and manually controlled means for energizing said solenoid.

3. An actuating mechanism for a float controlled pilot valve having a pivoted valve controlling lever movable by a float into valve opening and closing positions comprising a rocker mounted on the pivot for the float lever and having arms extending beneath said float lever, said rocker when free being moved by gravity to an inoperative position free from the float lever so that the float lever may be actuated by the float, a solenoid, a pull rod connected to the core of said solenoid, said pull rod having a head adapted to move into and out of engagement with said rocker, said solenoid when energized being adapted to move the head of the pull rod into engagement with the rocker for oscillating the rocker so as to engage and lift the float lever for closing the pilot valve, and manually controlled means for energizing said solenoid.

4. An actuating mechanism for a float controlled pilot valve having a pivoted valve controlling lever movable by a float into valve opening and closing positions comprising a rocker mounted on the pivot for the float lever and having arms extending beneath said float lever, said rocker when free being moved by gravity to an inoperative position free from the float lever so that the float lever may be actuated by the float, a second auxiliary rocker adapted to move into engagement with the first named rocker for causing the same to lift the float lever and close the pilot valve, hydraulic power means including a diaphragm, a plunger carried by the diaphragm and adapted to engage said auxiliary rocker for moving the same into engagement with the first named rocker, manually controlled means for furnishing fluid to the hydraulically controlled power means for moving the plunger into engagement with the auxiliary rocker, and a spring for withdrawing the plunger from engagement with the auxiliary rocker when the fluid pressure is cut off from said hydraulically operated power means.

5. An actuating mechanism for a float controlled pilot valve having a pivoted valve controlling lever movable by a float into valve opening and closing positions comprising a rocker mounted on the pivot for the float lever and having arms extending beneath said float lever, said rocker when free being moved by gravity to an inoperative position free from the float lever so that the float lever may be actuated by the float, a solenoid, a pull rod connected to the core of said solenoid, said pull rod having a head adapted to move into and out of engagement with said rocker, said solenoid when energized being adapted to move the head on the pull rod into engagement with the rocker for oscillating the rocker so as to engage and lift the float lever for closing the pilot valve, manually controlled means for energizing said solenoid, and a spring for moving said pull rod head out of engagement with the rocker when the solenoid is deenergized.

6. An actuating mechanism for a float controlled pilot valve having a pivoted valve controlling lever movable by a float into valve opening and closing positions, comprising swingably mounted rocker means having a part extending beneath the float lever and engageable therewith, said rocker means when free being moved by gravity to an inactive position wherein said part is free from active contact with the float lever so that the float lever may be actuated by the float, and manually controlled power means for moving the rocker means to cause said part to engage the float lever and move it to the valve closing position.

References Cited in the file of this patent
UNITED STATES PATENTS

| | | |
|---|---|---|
| 2,199,538 | Curry | May 7, 1940 |
| 2,309,770 | Johnson | Feb. 2, 1943 |
| 2,477,186 | Koehler | July 26, 1949 |
| 2,533,624 | Ray | Dec. 12, 1950 |
| 2,556,221 | Samiran | June 12, 1951 |